Feb. 25, 1958 G. F. PITTMAN, JR., ET AL 2,824,697

CONTROL APPARATUS

Filed June 8, 1954 2 Sheets-Sheet 1

WITNESSES

Edwin E. Bassler

K. H. Thomas

INVENTORS
George F. Pittman, Jr., Richard O. Decker
and Richard L. Bright
BY Ezra W. Savage
ATTORNEY Feb. 25, 1958 G. F. PITTMAN, JR., ET AL 2,824,697

CONTROL APPARATUS

Filed June 8, 1954 2 Sheets-Sheet 2

2,824,697

CONTROL APPARATUS

George F. Pittman, Jr., and Richard O. Decker, Pittsburgh, and Richard L. Bright, Adamsburg, Pa., assignors to Westinghouse Electric Corporation, East Pittsburgh, Pa., a corporation of Pennsylvania Application June 8, 1954, Serial No. 435,211

8 Claims. (Cl. 235—92)

This invention relates to integrating circuits or counter circuits, and more particularly to counter circuits that are adapted to be used with pulse-shaping circuits.

An object of this invention is to provide for producing an output pulse which is indicative of the total volt-second area of a plurality of input pulses, to thereby produce means for integrating the input pulses.

Another object of this invention is to provide for accurately counting a plurality of input pulses, by saturating a magnetic core member a predetermined amount each time an input pulse is received until the magnetic core member saturates in one direction, and then resetting the magnetic core member to saturation in the opposite direction, to thereby produce an output pulse of constant volt-second area.

Another object of this invention is to provide for sensing when a magnetic core member reaches saturation in one direction in response to a predetermined number of input pulses, to thereby initiate a resetting of the magnetic core member to saturation in the other direction, to thus produce an output pulse of constant volt-second area which is indicative of the number of input pulses required to saturate the magnetic core member.

A further object of this invention is to provide for rendering a counting device substantially insensitive to ambient temperature over a wide range by incorporating in the various stages of the counting device core materials which respond similarly to ambient temperature changes and by operating semiconductive devices in a manner to minimize the effect produced by ambient temperature changes.

Other objects of this invention will become apparent from the following description when taken in conjunction with the accompanying drawings in which.

Figure 1:
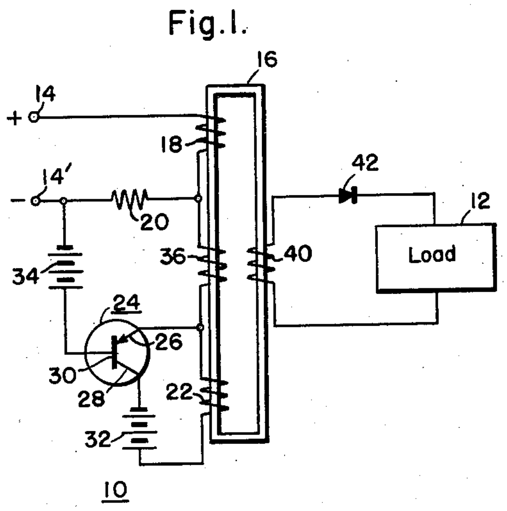
Figure 1 is a schematic diagram of an integrating circuit or counter circuit illustrating this invention.

Referring to Fig. 1 there is illustrated an integrating circuit or counting circuit 10 for producing output pulses of constant volt-second area across a load 12 in response to input pulses as applied to input terminals 14 and 14'. When utilizing the circuit 10 as a counter circuit the input pulses applied to the terminals 14 and 14' should be of constant volt-second area. However, when utilizing the circuit 10 as an integrating circuit, the input pulses applied to the terminals 14 and 14' are not necessarily of constant volt-second area since the circuit 10 produces an output pulse once a predetermined number of volt-seconds have been applied to its magnetic core member 16. In practice, the magnetic core member 16 is constructed of rectangular loop core material.

The circuit 10 may also be used as a delay circuit since it does not produce an output pulse until a predetermined number of pulses have been applied to the input terminals 14 and 14'. Thus, the delay effected if the input pulses are of constant volt-second area, is determined by the number of input pulses required to saturate the magnetic core member 16 in the positive direction, to thus produce an output pulse.

In general, the counter circuit 10 comprises a magnetic core member 16 which is driven to positive saturation after a predetermined number of input pulses have been applied to the input terminals 14 and 14', and which is driven to negative saturation once the magnetic core member 16 reaches saturation in the positive direction. Output pulses of rectangular wave shape and of constant volt-second area are produced across the load 12 during that portion of the operation when the magnetic core member 16 is being driven to saturation in the negative direction.

The means for driving the magnetic core member 16 to positive saturation comprises a main winding 18 disposed in inductive relationship with the magnetic core member 16, and circuit means for applying the input pulses to the main winding 18. In particular, an impedance member 20, specifically a resistor, is connected in series circuit relationship with the main winding 18, the series circuit being connected to the input terminals 14 and 14'. The function of the resistor 20 will be described hereinafter.

In order to reset the magnetic core member 16 to saturation in the negative direction once the input pulses applied to the terminals 14 and 14' effect a saturation of the core member in the positive direction, a control winding 22 is disposed in inductive relationship with the magnetic core member 16. In operation, the current flow through the control winding 22 is controlled by a semiconductive device or switching transistor 24 which comprises an emitter electrode 26, a collector electrode 28, and a base electrode 30. In particular, a direct-current source 32 is connected in circuit relationship with the switching transistor 24 and with the control winding 22 in order to effect a flow of current through the control winding 22 once the switching transistor 24 is rendered conductive as will be explained hereinafter.

In order to maintain the switching transistor 24 nonconductive while the input pulses, as applied to the terminals 14 and 14', are effecting a driving of the magnetic core member 16 to positive saturation, a direct-current bias source 34 is connected between the input terminal 14' and the base electrode 30 of the switching transistor 24. On the other hand, in order to maintain the switching transistor 24 conductive during the reset portion of the operation when the current flow through the control winding 22 is effecting a resetting of the magnetic core member 16 to negative saturation, a holding winding 36 is disposed in inductive relationship with the magnetic core member 16.

As hereinbefore mentioned, the output pulse appears across the load 12 during that portion of the operation when the magnetic core member 16 is being driven to saturation in the negative direction. For the purpose of producing output pulses across the load 12, an output winding 40 is disposed in inductive relationship with the magnetic core member 16. As illustrated, a one-way rectifier 42 is connected in series circuit relationship with the output winding 40 in order to prevent a voltage from appearing across the load 12 when the magnetic core member 16 is being driven to positive saturation. Thus, in practice, the output winding 40 is so disposed on the magnetic core member 16 that when current flows through the control winding 22 a voltage is induced across the output winding 40 of such polarity that current flows in the forward direction through the one-way rectifier 42. Also in practice, the main winding 18 and the control winding 22 are so disposed on the magnetic core member 16 that current flow therethrough produces a flux in the magnetic core member 16 of opposite direction.

The operation of the circuit 10 will now be described. Assuming that the circuit 10 is utilized as a counter circuit then the magnetic core member 16 will saturate a predetermined amount each time an input pulse of constant volt-second area is applied to the input terminals 14 and 14′. Once a predetermined number of input pulses have been applied to the terminals 14 and 14′ the magnetic core member 16 will saturate. When the magnetic core member 16 saturates, the voltage across the main winding 18 decreases to substantially zero magnitude and the voltage of the input pulse appears across the resistor 20.

The voltage produced across the resistor 20 is of such polarity and magnitude as to overcome the voltage produced by the bias source 34, to thus render the switching transistor 24 conductive. When the switching transistor 24 is rendered conductive, current flows from the positive side of the direct-current source 32 through the control winding 22, and the emitter and collector electrodes 26 and 28, to the negative side of the source 32. Such a current flow resets the magnetic core member 16 to negative saturation. However, once current starts flowing through the control winding 22 this current flow effects an induced voltage across the holding winding 36 of such a polarity and amplitude that the emitter electrode 26 is maintained positive with respect to the base electrode 30 of the switching transistor 24 while the current flow through the control winding 22 is driving the magnetic core member 16 to saturation in the negative direction. During that portion of the operation when current is flowing through the control winding 22 a voltage is also induced across the output winding 40 of such polarity as to effect a current flow through the one-way rectifier 42 in the forward direction, to thereby produce a pulse across the load 12.

It is to be understood that if the circuit 10 is constructed in a certain manner the resistor 20 may be omitted. The switching transistor 24 is then rendered conductive by an action that takes place once the magnetic core member 16 reaches a positive saturation. In particular, when the magnetic core member 16 reaches positive saturation there is a momentary reversal of the polarity of the voltage across the holding winding 36, such as to render the emitter electrode 26 positive with respect to the base electrode 30, to thus render the switching transistor 24 conductive. Then, the current flow through the control winding 22 effects an induced voltage across the holding winding 36 to maintain the transistor 24 conductive.

Figure 2:
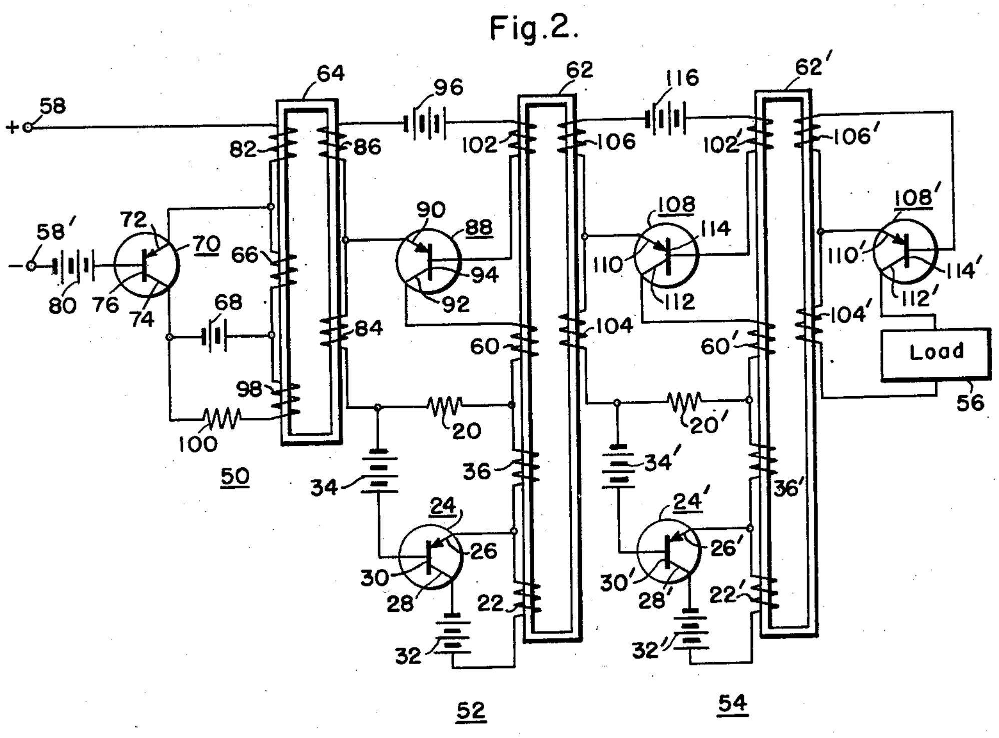
Fig. 2 is a schematic diagram illustrating how two cascaded stages each similar to the counter circuit of Fig. 1 are utilized in conjunction with a pulse-shaping circuit.

Referring to Fig. 2, there is illustrated a circuit which comprises a pulse-shaping circuit 50 and two cascaded counting stages 52 and 54. If the circuit of Fig. 2 is utilized as a counting device an output pulse will appear across a load 56 after the product of the number of pulses required to saturate each of the stages 52 and 54 is applied to the input terminals 58 and 58′ of the pulse-shaping circuit 50. For instance, if each of the stages 52 and 54 is designed to saturate in 10 pulses, a decade counter results.

By cascading stages, such as the stages 52 and 54, in the manner illustrated, relatively long time delays may be obtained with a high degree of accuracy. For instance, three cascaded stages with a ten pulse delay each would yield an overall delay of one thousand pulses. Operating on pulses obtained from a 60-cycle line, this would represent a delay of 16.67 seconds with an accuracy of ½ cycle of the 60-cycle supply or 8.33 milliseconds.

Before describing the manner in which the pulse-shaping circuit 50 cooperates with the counting stages 52 and 54, the pulse-shaping circuit 50, which produces output pulses of constant volt-second area across a main winding 60 of the counter stage 52, will be described. In this instance, the main winding 60 is disposed in inductive relationship with a magnetic core member 62 which is constructed of rectangular loop core material.

In general, the pulse-shaping circuit 50 comprises a magnetic core member 64 which is driven to positive saturation in response to input pulses, as applied to the input terminals 58 and 58′, and which is driven to negative saturation once the magnetic core member 64 reaches saturation in the positive direction. Output pulses of constant volt-second area are produced across the main winding 60 of the counting stage 52 during that portion of the operation when the magnetic core member 64 is being driven to positive saturation.

In order to drive the magnetic core member 64 to positive saturation, a main winding 66 is disposed in inductive relationship with the magnetic core member 64, the main winding 66 being connected to be energized from a direct-current source 68 when a semiconductive device or switching transistor 70 is rendered conductive in response to the input pulses, as applied to the terminals 58 and 58′. In this instance, the switching transistor 70 comprises an emitter electrode 72, a collector electrode 74, and a base electrode 76.

In operation, the switching transistor 70 is rendered conductive when input pulses of greater than a predetermined amplitude, and of a polarity as shown in Fig. 2 of the drawings, are applied to the input terminals 58 and 58′. The reason the input pulses must be of greater than a predetermined amplitude is that they must overcome the voltage produced by a direct-current bias source 80 which functions to maintain the switching transistor 70 non-conductive while the magnetic core member 64 is being driven to saturation in the negative direction. Thus, in operation the emitter electrode 72 is rendered positive with respect to the base electrode 76 when an input pulse is applied to the input terminals 58 and 58′.

In order to maintain the switching transistor 70 conductive on termination of an input pulse and until the magnetic core member 64 reaches positive saturation, a holding winding 82 is disposed in inductive relationship with the magnetic core member 64. In practice, the holding winding 82 is so disposed on the magnetic core member 64 that the current flow through the main winding 66, as effected by the source 68, effects an induced voltage across the holding winding 82 of such polarity that the emitter electrode 72 of the switching transistor 70 is maintained positive with respect to the base electrode 76. Therefore, in operation, the voltage induced across the holding winding 82 must also be of greater amplitude than the voltage produced by the bias source 80.

As illustrated in Fig. 2, the main winding 60 of the counter stage 52 is conductively isolated from the input side of the pulse-shaping circuit 50. In particular, the main winding 60 is energized in accordance with the voltage induced across an output winding 84 while the magnetic core member 64 is being driven to positive saturation by the current flow through the main winding 66. As illustrated, the output winding 84 is disposed in inductive relationship with the magnetic core member 64.

In addition, a holding winding 86 is disposed in inductive relationship with the magnetic core member 64, the output winding 84 and holding winding 86 being so disposed on the magnetic core member 64 and so interconnected with a switching transistor or semiconductive device 88 and with the main winding 60 of the counter stage 52 that current only flows through the main winding 60 when the magnetic core member 64 of the pulse-shaping circuit 50 is being driven to positive saturation.

As was the case with the switching transistor 70, the switching transistor 88 comprises three electrodes, namely an emitter electrode 90, a collector electrode 92, and a base electrode 94. In order to further insure that current does not flow through the main winding 60 of the counter stage 52 while the magnetic core member 64 of the pulse shaping circuit 50 is being driven to saturation in the negative direction, a direct-current bias source 96 is connected in circuit relationship with the switching transistor 88.

In practice, the voltage induced across the output winding 84 of the pulse-shaping circuit is of rectangular wave shape and of constant volt-second area. However, the amplitude of the output pulse appearing across the main winding 60 of the counter stage 52 is determined by the magnitude of the voltage produced by the source 68 of the pulse-shaping circuit 50 and the turns ratio between the main winding 66 and the output winding 84. On the other hand, the width of the output pulse as produced across the main winding 60 is determined by the magnitude of the voltage produced by the source 68, the characteristics of the main winding 66, and the size of the magnetic core member 64 of the pulse-shaping circuit 50.

In order to drive the magnetic core member 64 to negative saturation once it reaches positive saturation due to the current flow through the main winding 66, a control winding 98 is disposed in inductive relationship with the magnetic core member 64 and is connected to be energized from the source 68. In particular, the control winding 98 is connected in series circuit relationship with a current-limiting resistor 100, the series circuit being connected across the source 68. In practice, the impedance of the current-limiting resistor 100 is such as to minimize the peak current flow through the control winding 98 when the switching transistor 70 is conductive and the source 68 is effecting a current flow through the main winding 66. Also in practice, the control winding 98 is so disposed on the magnetic core member 64 that the current flow therethrough produces a flux in the magnetic core member 64 which opposes the flux produced by the current flow through the main winding 66.

The counter stage 52 will now be described. As illustrated, the counter stage 52 is similar to the counter circuit 10 illustrated in Fig. 1, and like components of Figs. 1 and 2 have been given the same reference characters. The main distinction between the counter circuit 10 and the counter stage 52 is that in the counter stage 52 an additional holding winding 102 is disposed in inductive relationship with the magnetic core member 62 in order to maintain the switching transistor 88 non-conductive while the source 32 of the counter stage 52 is effecting a driving of the magnetic core member 62 to negative saturation. If the switching transistor 88 were not maintained non-conductive while the magnetic core member 62 is being reset to negative saturation, the voltage induced across the main winding 60, by the current flow through the control winding 22, would effect a current flow through the output winding 84 of the pulse-shaping circuit 50. Thus, by providing the holding winding 82 and interconnecting it with the switching transistor 88, as illustrated, the counter stage 52 is decoupled from the pulse-shaping circuit 50 when the magnetic core member 62 of the counter stage 52 is being reset to negative saturation.

The output circuit for the counter stage 52 is similar to the output circuit of the pulse-shaping circuit 50. As illustrated, the output circuit for the counter stage 52 comprises an output winding 104 and a holding winding 106 disposed in inductive relationship with the magnetic core member 62, and a switching transistor 108 having an emitter electrode 110, a collector electrode 112, and a base electrode 114. In practice, the output winding 104 and the holding winding 106 are so disposed on the magnetic core member 62 and so interconnected with the switching transistor 108 that the switching transistor 108 is only conductive when the control winding 22 of the counter stage 52 is conducting current to thereby reset the magnetic core member 62 to negative saturation. Thus, when input pulses are being applied to the main winding 60 of the counter stage 52 to drive the magnetic core member 62 to positive saturation the switching transistor 108 is non-conductive.

The second counter stage 54 is identical to the first counter stage 52. Therefore, in order to simplify the description, like components of the second counter stage 54 have been given the same reference characters as the corresponding components of the first counter stage 52 except that the reference characters of the counter stage 54 have been primed. Further, the direct-current bias source 116 corresponds to the bias source 96 and performs a like function. Since the second counter stage 54 functions in the same manner as does the first counter stage 52, a further description of the stage 54 is deemed unnecessary.

The operation of the overall circuit of Fig. 2 will now be described. When an input pulse of a polarity shown is applied to the terminals 58 and 58' the emitter electrode 72 of the switching transistor 70 is rendered positive with respect to the base electrode 76, thereby rendering the switching transistor 70 conductive. When the transistor 70 is rendered conductive, in response to the input pulse, the source 68 effects a current flow through the main winding 66 to thereby drive the magnetic core member 64 to positive saturation. In particular, current flows from the right end of the source 68, as illustrated, through the main winding 66 and the emitter and collector electrodes 72 and 74, to the left end of the source 68. Peak current also flows during this portion of the operation through the control winding 98. However, this peak current flow is minimized by the current-limiting resistor 100 and thus the current flow through the main winding 66 is able to drive the magnetic core member 64 to positive saturation.

The current flow through the main winding 66 induces a voltage across the holding winding 82 of such amplitude and polarity as to hold the switching transistor 70 conductive until the magnetic core member 64 saturates in the positive direction. In other words, once the input pulse, applied to the terminals 58 and 58', renders the switching transistor 70 conductive, the holding winding 82 maintains it conductive until the magnetic core member 64 saturates in the positive direction..

As hereinbefore mentioned, the current flow through the main winding 66 also induces a voltage across the output winding 84, this induced voltage being of such polarity that the emitter electrode 90 of the switching transistor 88 is rendered positive with regard to the collector electrode 92. In addition, the current flow through the main winding 66 induces a voltage across the holding winding 86 of such polarity as to render the emitter electrode 90 positive with respect to the base electrode 94. Such being the case, the switching transistor 88 is rendered conductive and the induced voltage across the output winding 84, as produced by the current flow through the main winding 66, effects a current flow from the upper end of the output winding 84, as illustrated, through the emitter and collector electrodes 90 and 92, the main winding 60 of the counter stage 52, and the resistor 20, to the lower end of the output winding 84. This current flow through the main winding 60 drives the magnetic core member 62 of the counter stage 52 a predetermined amount in the direction of positive saturation.

When the magnetic core member 64 of the pulse-shaping circuit 50 reaches positive saturation, the voltage appearing across the holding winding 82 is reduced to substantially zero magnitude. This enables the bias source 80 to render the switching transistor 70 non-conductive. Current then flows through the control winding 98 of the pulse-shaping circuit 50 to thereby drive the magnetic core member 64 to saturation in the negative direction. However, the current flow through the control winding 98 induces a voltage across the holding winding 86 of such polarity as to render the base electrode 94 of the switching transistor 88 positive with respect to the emitter electrode 90. In addition, the current flow through the control winding 98 induces a voltage across the output winding 84 of such a polarity that the collector electrode 92 of the switching transistor 88 is rendered positive with respect to the emitter electrode 90. Thus, the switching transistor 88 in cooperation with the output and holding windings 84 and 86, respectively, prevents output pulses from appearing across the main winding 60 of the counter circuit 52 when the magnetic core member 64 of the pulse-shaping circuit 50 is being driven to negative saturation. Once the magnetic core member 64 reaches negative saturation, the next input pulse, applied to the terminals 58 and 58', again renders the switching transistor 70 conductive and the above-described operation with respect to the pulse-shaping circuit 50 is repeated. Thus, each time an input pulse is applied to the terminals 58 and 58' an output pulse appears across the main winding 60 of the counter stage 52. Once a predetermined number of pulses have been applied to the main winding 60, the magnetic core member 62 of the counter stage 52 saturates.

When the magnetic core member 62 of the counter stage 52 saturates, the next output pulse from the pulse-shaping circuit 50 appears across the resistor 20, to thereby overcome the voltage produced by the bias source 34, and thus render the switching transistor 24 conductive. Once the switching transistor 24 is rendered conductive, current flows from the positive side of the source 32 through the control winding 22, and the emitter and collector electrodes 26 and 28 of the switching transistor 24, to the negative side of the source 32. The current flow through the control winding 22 resets the magnetic core member 62 to saturation in the negative direction. In operation, the current flow through the control winding 22 induces a voltage across the holding winding 36 of such polarity as to maintain the switching transistor 24 conductive, that is, the emitter electrode 26 is maintained positive with respect to the base electrode 30.

Further, the current flow through the control winding 22 effects an induced voltage across the holding winding 102 of such polarity as to maintain the switching transistor 88 of the pulse-shaping circuit 50 non-conductive while the magnetic core member 62 is being reset to negative saturation. Such being the case, the counter stage 52 is effectively decoupled from the pulse-shaping circuit 50 while the magnetic core member 62 is being driven to negative saturation.

In operation, the current flow through the control winding 22 also induces voltages across the output and holding windings 104 and 106, respectively, of such magnitude and polarity as to render the switching transistor 108 conductive, the voltage induced across the holding winding 106 being of greater amplitude than the voltage produced by the source 116. Thus, while the magnetic core member 62 of the counter stage 52 is being reset to negative saturation the output pulse from the counter stage 52 effects a current flow through the main winding 60' of the counter stage 54, to thereby drive the magnetic core member 62' a predetermined amount in the direction of positive saturation.

After a predetermined number of output pulses have appeared across the output winding 104 of the counter stage 52 the magnetic core member 62' of the counter stage 54 saturates. When the magnetic core member 62' saturates, a resetting of the magnetic core member 62' to negative saturation takes place in the same manner as described with reference to the counter stage 52 to thereby produce a pulse across the load 56. Thus in operation, a predetermined number of pulses are applied to the input terminals 58 and 58' of the pulse-shaping circuit 50 before the magnetic core member 62 of the counter stage 52 saturates. However, the magnetic core member 62 of the counter stage 52 has to saturate a predetermined number of times before the magnetic core member 62' of the counter stage 54 saturates, to thereby produce an output pulse across the load 56.

Figure 3:
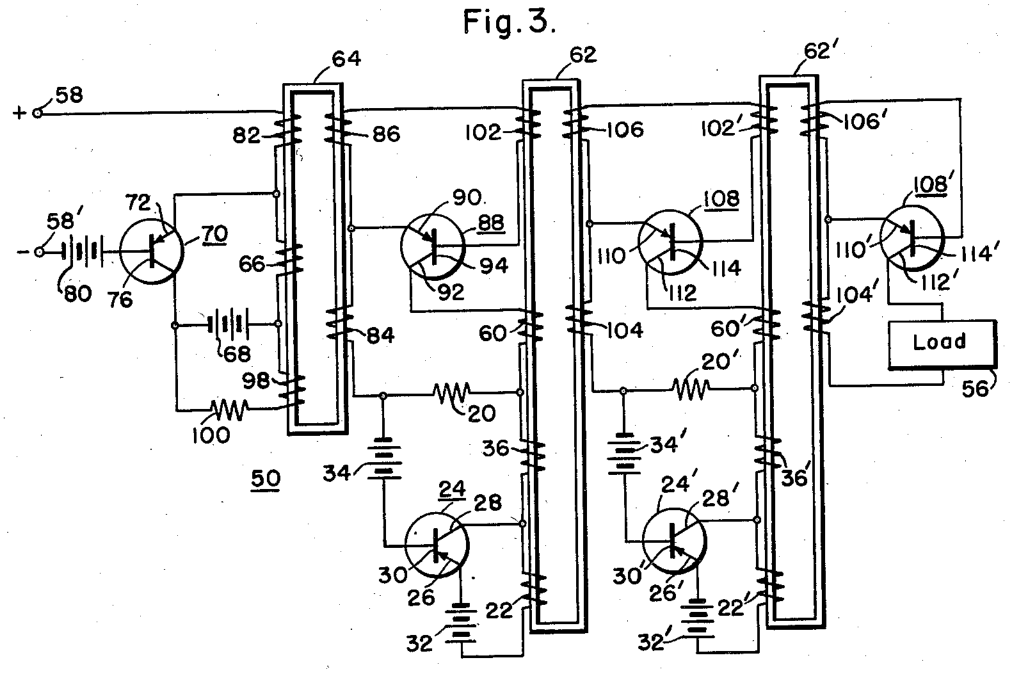
Fig. 3 is a schematic diagram of another embodiment of the apparatus of Fig. 2.

Referring to Fig. 3 there is illustrated another embodiment of this invention in which like components of Figs. 2 and 3 have been given the same reference characters. The main distinction between the apparatus of Figs. 2 and 3 is that in the apparatus of Fig. 3 the positioning of the emitter and collector electrodes 26 and 28 of the switching transistor 24 is reversed. Also, the emitter and collector electrodes 26' and 28' of the switching transistor 24', as illustrated in Fig. 3, are reversed from their position as illustrated in Fig. 2.

By reversing the positioning of the emitter and collector electrodes of the switching transistors 24 and 24', the switching transistors 24 and 24' of Fig. 3 provide a lower leakage, as compared to the switching transistors 24 and 24' of Fig. 2, during that portion of the operation when the magnetic core member 62 is being driven to positive saturation, and during that portion of the operation when the magnetic core member 62' is being driven to positive saturation. Thus, the sources 32 and 32' of Fig. 3 can effect substantially no resetting of the magnetic core members 62 and 62', respectively, in the direction of negative saturation during that portion of the operation when the magnetic core members 62 and 62', respectively, are being driven in the direction of positive saturation. Another consequence of this interchange of the emitter and collector electrodes 26 and 28, and 26' and 28', is that the unit of Fig. 3 can be operated at much higher ambient temperatures than are ordinarily permissible with transistor circuits. That is, because of this interchange, the device of Fig. 3 is less sensitive to ambient temperature changes than the device of Fig. 2.

When the switching transistor 24 of Fig. 3 is rendered conductive current flows from the positive side of the source 32 through the control winding 22, the collector electrode 28 of the switching transistor 24, and the emitter electrode 26, to the negative side of the source 32. This current flow through the control winding 22 produces the same effect as described with reference to Fig. 2.

During that portion of the operation when the switching transistor 24' of Fig. 3 is rendered conductive, current flows from the positive side of the source 32' through the control winding 22', the collector electrode 28' of the switching transistor 24', and the emitter electrode 26', to the negative side of the source 32'. Since the remaining operation of the apparatus of Fig. 3 is similar to the operation of Fig. 2, a further description of such operation is deemed unnecessary.

Figure 4:
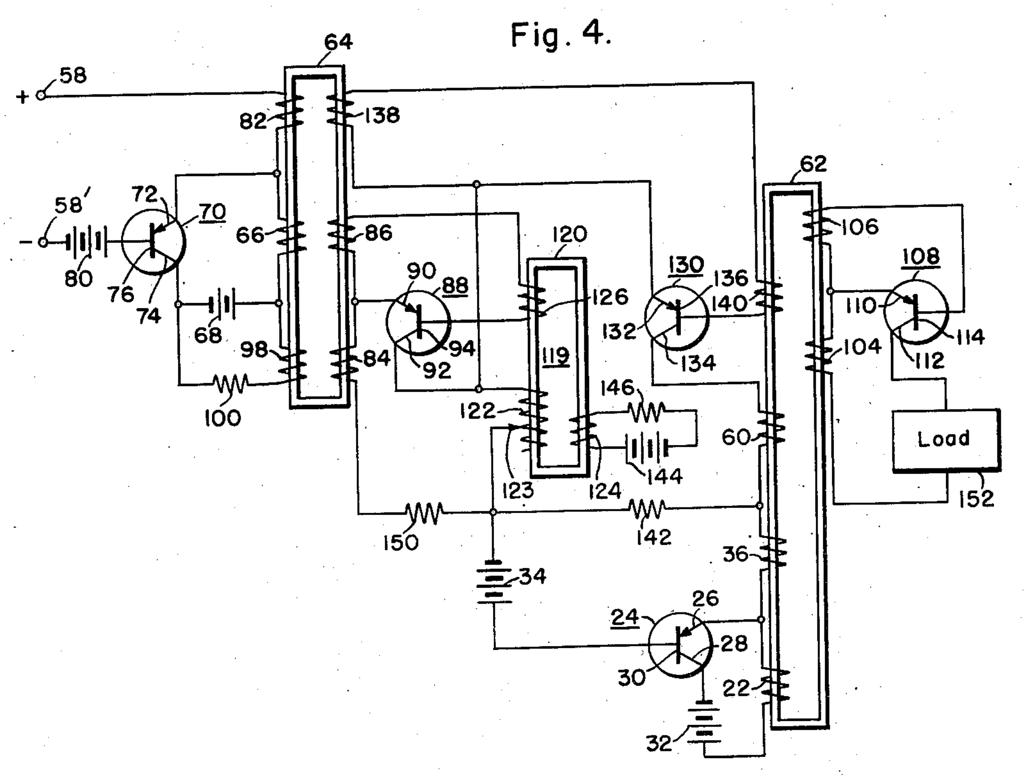
Fig. 4 is a schematic diagram illustrating means for changing the ratio between the number of output pulses to input pulses of a counter circuit.

Referring to Fig. 4, there is illustrated still another embodiment of this invention in which like components of Figs. 2 and 4 have been given the same reference characters. The main distinction between the apparatus of Figs. 2 and 4 is that in the apparatus of Fig. 4 means are provided for varying the time duration of the pulses applied to the main winding 60 of the first counter stage. Such a variation in the time duration of the pulses applied to the main winding 60 changes the number of pulses, as applied to the main winding 60, required to saturate the magnetic core member 62. Thus, the counting effect or delay effect brought about by the apparatus of Fig. 4 can be readily varied.

The means for varying the time duration of the pulses applied to the main winding 60 comprises a saturable reactor 119 having a magnetic core member 120 constructed of rectangular loop core material. As illustrated, a control winding 122, a reset winding 124, and a holding winding 126 are disposed in inductive relationship with the magnetic core member 120, the control winding 122 being provided with a movable contact member 123.

In order to establish a conductive path to the main winding 60 of the first counter stage when the magnetic core member 64 of the pulse-shaping circuit is being driven to positive saturation, a switching transistor 130 is connected in circuit relationship with the switching transistor 88. In this instance, the switching transistor 130 comprises an emitter electrode 132, a collector electrode 134, and a base electrode 136.

In operation when the magnetic core member 64 is being driven to positive saturation the holding winding 86 maintains the switching transistor 88 conductive. However, in order to maintain the switching transistor 130 conductive during this same portion of the operation, a holding winding 138 is disposed in inductive relationship with the magnetic core member 64. The holding windings 86 and 138 likewise function to maintain the switching transistors 88 and 130, respectively, non-conductive during that portion of the operation when the magnetic core member 64 is being driven to negative saturation.

In order to maintain the switching transistor 130 non-conductive when the magnetic core member 62 is being driven to negative saturation, and thus effectively decouple the pulse-shaping circuit from the counter stage, a holding winding 140 is disposed in inductive relationship with the magnetic core member 62. In particular, the holding winding 140 is connected in circuit relationship with the emitter and base electrodes 132 and 136, respectively, of the switching transistor 130 so that when the magnetic core member 62 is being driven to negative saturation the induced voltage across the holding winding 140, as effected by the current flow through the control winding 22, maintains the base electrode 136 positive with respect to the emitter electrode 132.

As illustrated, the control winding 122 of the saturable reactor 119 is connected so as to be in parallel circuit relationship with the main winding 60 of the counter stage when the switching transistor 130 is conductive. In particular, the control winding 122 is connected in series circuit relationship with an impedance member or resistor 142 and with the switching transistor 130, the series circuit being connected in parallel circuit relationship with the main winding 60. Thus, the control winding 122 of the saturable reactor 119 acts as a shunt around the main winding 60 once the magnetic core member 120 of the saturable reactor 119 saturates in the positive direction.

In order to reset the magnetic core member 120 of the saturable reactor 119 to saturation in the negative direction during the time interval when the magnetic core member 64 is being reset to negative saturation, a series circuit including a direct-current source 144 and a current-limiting resistor 146 is connected across the reset winding 124. For further insuring that the switching transistor 88 remains non-conductive when the reset winding 124 is effecting a driving of the magnetic core member 120 to saturation in the negative direction, the holding winding 126 of the saturable reactor 119 is connected in circuit relationship with the emitter and base electrodes 90 and 94, respectively, of the switching transistor 88.

The operation of the apparatus of Fig. 4 will now be described. When an input pulse is applied to the input terminals 58 and 58' current flows through the main winding 66 of the pulse-shaping circuit. The current flow through the main winding 66 effects an induced voltage across the holding windings 86 and 138 and across the output winding 84 of such polarity as to render the switching transistors 88 and 130 conductive. When the switching transistors 88 and 130 are rendered conductive, current flows from the upper end of the output winding 84, as illustrated, through the emitter and collector electrodes 90 and 92, respectively, of the switching transistor 88, the emitter and collector electrodes 132 and 134, respectively, of the switching transistor 130, the main winding 60 of the counter stage, the resistor 142, and a current-limiting resistor 150, to the lower end of the output winding 84. During this same portion of the cycle of operation current also flows from the upper end of the output winding 84, as illustrated, through the emitter and collector electrodes 90 and 92, respectively, of the switching transistor 88, the control winding 122 of the saturable reactor 119, and the current-limiting resistor 150, to the lower end of the output winding 84.

When a predetermined number of volt-seconds have been applied to the magnetic core member 120 of the saturable reactor 119, the magnetic core member 120 saturates. Once the magnetic core member 120 saturates, a shunt circuit is created around the main winding 60 of the counter stage and substantially no voltage appears across the main winding 60. However, the time interval that the voltage appears across the main winding 60 is determined by the setting of the movable contact member 123 of the control winding 122. Thus, the number of pulses, as applied to the input terminals 58 and 58', required to saturate the magnetic core member 62 and thus produce an output pulse across the load 152 is determined by the setting of the movable contact member 123 of the control winding 122.

In operation, when the switching transistor 88 is rendered non-conductive by the action of current flowing through the control winding 98 of the pulse-shaping circuit, the reset winding 124 of the saturable reactor 119 effects a resetting of the magnetic core member 120 to negative saturation. During this resetting of the magnetic core member 120 to negative saturation a voltage is induced across the holding winding 126 of the saturable reactor 119 of such polarity as to insure that the switching transistor 88 is maintained non-conductive during this portion of the operation.

After a predetermined number of pulses have been applied to the main winding 60, the magnetic core member 62 saturates. When the magnetic core member 62 saturates a voltage appears across the resistor 142 of such polarity and amplitude as to render the switching transistor 24 conductive as hereinbefore explained. Since the remaining operation of the apparatus of Fig. 4 is similar to the operation of the apparatus of Fig. 2, a further description of such operation is deemed unnecessary.

It is to be understood that any of the switching transistors shown herein can be connected in the grounded base connection or in the inverted connection or in any other known connections by making minor variations as are well known in the art.

The apparatus embodying the teachings of this invention has several advantages. For instance, each counter stage can be constructed so as to count from two to a hundred pulses. In addition, each counter stage has extremely low maintenance and a minimum size and number of component parts. The apparatus of Figs. 2 through 4, particularly Fig. 3, can operate satisfactorily over a wider temperature range than conventional transistorized flip-flop scalers.

Since numerous changes may be made in the above-described apparatus and circuits and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. In a magnetic device responsive to input pulses and connected to supply output pulses to a load, the combination comprising, a magnetic core member, a main winding disposed in inductive relationship with the magnetic core member, circuit means for applying said input pulses to the main winding, whereby the magnetic core member saturates in one direction after a plurality of the said input pulses are applied to the main winding, a semiconductive device, a holding winding and a control winding disposed in inductive relationship with the magnetic core member, other circuit means, interconnected with the semiconductive device and with the holding winding, for maintaining the semiconductive device non-conductive while the said input pulses are being applied to the main winding and for rendering the semiconductive device conductive when the magnetic core member saturates in said one direction, further circuit means, interconnected with the semiconductive device and with the control winding, for effecting a flow of current through the control winding when the semiconductive device becomes conductive, to thereby drive the magnetic core member to saturation in the other direction, and means for connecting said load so as to be energized in accordance with the change in flux in the magnetic core member as produced by the current flow through the control winding.

2. In a magnetic device responsive to input pulses and connected to supply output pulses to a load, the combination comprising, a magnetic core member, a main winding disposed in inductive relationship with the magnetic core member, circuit means including an impedance member for applying said input pulses to the main winding, whereby the magnetic core member saturates in one direction after a plurality of the said input pulses are applied to the main winding, a semiconductive device, a holding winding and a control winding disposed in inductive relationship with the magnetic core member, a bias source connected to maintain the semiconductive device non-conductive while the said input pulses are being applied to the main winding, other circuit means, including the holding winding for applying the difference between the voltage produced by the bias source and the voltage appearing across the impedance member, when the magnetic core member saturates in said one direction, to the semiconductive device to thereby render the semiconductive device conductive, further circuit means interconnected with the semiconductive device and with the control winding, for effecting a flow of current through the control winding when the semiconductive device becomes conductive, to thereby drive the magnetic core member to saturation in the other direction, the current flow through the control winding effecting an induced voltage across the holding winding to maintain the semiconductive device conductive until the magnetic core member saturates in said other direction, and means for connecting said load so as to be energized in accordance with the change in flux in the magnetic core member as produced by the current flow through the control winding.

3. In a magnetic device responsive to input pulses and connected to supply output pulses to a load, the combination comprising, a magnetic core member, a main winding disposed in inductive relationship with the magnetic core member, circuit means for applying said input pulses to the main winding, whereby the magnetic core member saturates in one direction after a plurality of the said input pulses are applied to the main winding, a semiconductive device, a holding winding and a control winding disposed in inductive relationship with the magnetic core member, other circuit means, interconnected with the semiconductive device and with the holding winding, for maintaining the semiconductive device non-conductive while the said input pulses are being applied to the main winding and for rendering the semiconductive device conductive when the magnetic core member saturates in said one direction, further circuit means, interconnected with the semiconductive device and with the control winding, for effecting a flow of current through the control winding when the semiconductive device becomes conductive, to thereby drive the magnetic core member to saturation in the other direction, an output winding disposed in inductive relationship with the magnetic core member, and means for interconnecting said load with the output winding.

4. In a magnetic device responsive to input pulses and connected to supply output pulses to a load, the combination comprising, a magnetic core member, a main winding disposed in inductive relationship with the magnetic core member, circuit means including an impedance member for applying said input pulses to the main winding, whereby the magnetic core member saturates in one direction after a plurality of the said input pulses are applied to the main winding, a semiconductive device, a holding winding and a control winding disposed in inductive relationship with the magnetic core member, a bias source connected to maintain the semiconductive device non-conductive while the said input pulses are being applied to the main winding, other circuit means, including the holding winding for applying the difference between the voltage produced by the bias source and the voltage appearing across the impedance member, when the magnetic core member saturates in said one direction, to the semiconductive device to thereby render the semiconductive device conductive, further circuit means, interconnected with the semiconductive device and with the control winding, for effecting a flow of current through the control winding when the semiconductive device becomes conductive, to thereby drive the magnetic core member to saturation in the other direction, the current flow through the control winding effecting an induced voltage across the holding winding to maintain the semiconductive device conductive until the magnetic core member saturates in said other direction, and an output winding disposed in inductive relationship with the magnetic core member, and means for interconnecting said load with the output winding.

5. In electrical apparatus responsive to input pulses and connected to supply pulses to a load, the combination comprising, a pulse-shaping circuit for producing pulses of constant volt-second area in response to said input pulses, the pulse-shaping circuit including, a first magnetic core member, a semiconductive device, winding means disposed in inductive relationship with the first magnetic core member and connected to be energized from a source of direct current when the semiconductive device is rendered conductive to thereby drive the first magnetic core member to saturation in the positive direction, circuit means for rendering the semiconductive device conductive in response to said input pulses and for holding the semiconductive device conductive until the first magnetic core member saturates in said positive direction, the winding means also being connected to be energized by the source of direct current when the first magnetic core member saturates in the positive direction, to thereby drive the first magnetic core member to saturation in the negative direction, an output winding and a holding winding disposed in inductive relationship with the first magnetic core member, and another semiconductive device, a counter circuit including, a second magnetic core member, a main winding disposed in inductive relationship with the second magnetic core member, the output winding and the holding winding of the pulse-shaping circuit being so disposed and so interconnected with said main winding and with said another semiconductive device that current only flows through the said main winding when the first magnetic core member is being driven to saturation in the positive direction, whereby the second magnetic core member saturates in one direction after the occurrence of a plurality of the said input pulses, a further semiconductive device, a control winding and a holding winding disposed in inductive relationship with the second magnetic core member, circuit means, interconnected with said further semiconductive device, and with the holding winding of the counter circuit, for maintaining the said further semiconductive device non-conductive while the said main winding is energized and for rendering the said further semiconductive device conductive when the second magnetic core member saturates in said one direction, further circuit means, interconnected with the said further semiconductive device and with said control winding, for effecting a flow of current through the said control winding when the said further semiconductive device becomes conductive, to thereby drive the second magnetic core member to saturation in the other direction, another holding winding disposed in inductive relationship with the second magnetic core member, said another holding winding being so interconnected with the said another semiconductive device that when current flows through the said control winding the voltage induced across the said another holding winding maintains the said another semiconductive device non-conductive while current flows through the said control winding, to thereby decouple the counter circuit from the pulse-shaping circuit during this portion of the operation, and means for connecting said load so as to be energized in accordance with the change in flux in the second magnetic core member as produced by the current flow through the said control winding.

6. In electrical apparatus responsive to input pulses and connected to supply pulses to a load, the combination comprising, a pulse-shaping circuit for producing pulses of constant volt-second area in response to said input pulses, the pulse-shaping circuit including, a first magnetic core member, a semiconductive device, winding means disposed in inductive relationship with the first magnetic core member and connected to be energized from a source of direct current when the semiconductive device is rendered conductive to thereby drive the first magnetic core member to saturation in the positive direction, circuit means for rendering the semiconductive device conductive in response to said input pulses and for holding the semiconductive device conductive until the first magnetic core member saturates in said positive direction, the winding means also being connected to be energized by the source of direct current when the first magnetic core member saturates in the positive direction, to thereby drive the first magnetic core member to saturation in the negative direction, an output winding and a holding winding disposed in inductive relationship with the first magnetic core member, and another semiconductive device, a counting circuit including, a second magnetic core member, a main winding disposed in inductive relationship with the second magnetic core member, the output winding and the holding winding of the pulse-shaping circuit being so disposed and so interconnected with said main winding and with said another semiconductive device that current only flows through the said main winding when the first magnetic core member is being driven to saturation in the positive direction, whereby the second magnetic core member saturates in one direction after the occurrence of a plurality of the said input pulses, means connected in parallel circuit relationship with the said main winding for varying the time interval of each of the pulses applied to the said main winding, a further semiconductive device, a control winding and a holding winding disposed in inductive relationship with the second magnetic core member, circuit means, interconnected with said further semiconductive device and with the holding winding of the counter circuit, for maintaining the said further semiconductive device non-conductive while the said main winding is energized and for rendering the said further semiconductive device conductive when the second magnetic core member saturates in said one direction, further circuit means, interconnected with the said further semiconductive device and with said control winding, for effecting a flow of current through the said control winding when the said further semiconductive device becomes conductive, to thereby drive the second magnetic core member to saturation in the other direction, another holding winding disposed in inductive relationship with the second magnetic core member, said another holding winding being so interconnected with the said another semiconductive device that when current flows through the said control winding the voltage induced across the said another holding winding maintains the said another semiconductive device non-conductive while current flows through the said control winding, to thereby decouple the counter circuit from the pulse-shaping circuit during this portion of the operation, and means for connecting said load so as to be energized in accordance with the change in flux in the second magnetic core member as produced by the current flow through the said control winding.

7. In electrical apparatus responsive to input pulses and connected to supply pulses to a load, the combination comprising, a pulse-shaping circuit for producing pulses of constant volt-second area in response to said input pulses, the pulse-shaping circuit including, a first magnetic core member, a semiconductive device, winding means disposed in inductive relationship with the first magnetic core member and connected to be energized from a source of direct current when the semiconductive device is rendered conductive to thereby drive the first magnetic core member to saturation in the positive direction, circuit means for rendering the semiconductive device conductive in response to said input pulses and for holding the semiconductive device conductive until the first magnetic core member saturates in said positive direction, the winding means also being connected to be energized by the source of direct current when the first magnetic core member saturates in the positive direction, to thereby drive the first magnetic core member to saturation in the negative direction, an output winding and a holding winding disposed in inductive relationship with the first magnetic core member, and another semiconductive device, a counter circuit including, a second magnetic core member, a main winding disposed in inductive relationship with the second magnetic core member, the output winding and the holding winding of the pulse-shaping circuit being so disposed and so interconnected with said main winding and with said another semiconductive device that current only flows through the said main winding when the first magnetic core member is being driven to saturation in the positive direction, whereby the second magnetic core member saturates in one direction after the occurrence of a plurality of the said input pulse, a saturable reactor having a control winding disposed to be connected in parallel circuit relationship with the said main winding so that the time interval of each of the pulses applied to the said main winding can be varried by changing the number of turns of said control winding, a further semiconductive device, a control winding and a holding winding disposed in inductive relationship with the second magnetic core member, circuit means, interconnected with said further semiconductive device and with the holding winding of the counter circuit, for maintaining the said further semiconductive device non-conductive while the said main winding is energized and for rendering the said further semiconductive device conductive when the second magnetic core member saturates in said one direction, further circuit means, interconnected with the said further semiconductive device and with said control winding, for effecting a flow of current through the said control winding when the said further semiconductive device becomes conductive, to thereby drive the second magnetic core member to saturation in the other direction, another holding winding disposed in inductive relationship with the second magnetic core member, said another holding winding being so interconnected with the said another semiconductive device that when current flows through the said control winding the voltage induced across the said another holding winding maintains the said another semiconductive device non-conductive while current flows through the said control winding, to thereby decouple the counter circuit from the pulse-shaping circuit during this portion of the operation, and means for connecting said load so as to be energized in accordance with the change in flux in the second magnetic core member as produced by the current flow through the said control winding.

8. In a magnetic device responsive to input pulses and connected to supply output pulses to a load, the combination comprising, a magnetic core member, a main winding disposed in inductive relationship with the magnetic core member, circuit means for applying said input pulses to the main winding, whereby the magnetic core member saturates in one direction after a plurality of said input pulses are applied to the main winding, a semiconductive device, a control winding disposed in inductive relationship with the magnetic core member, other circuit means, inter-connected with the semiconductive device and responsive to the said input pulses, for maintaining the semiconductive device non-conductive while the said input pulses are being applied to the main winding and for rendering the semiconductive device conductive when the magnetic core member saturates in said one direction, further circuit means, interconnected with the semiconductive device and with the control winding, for effecting a flow of current through the control winding when the semiconductive device becomes conductive, to thereby drive the magnetic core member to saturation in the other direction, another winding disposed in inductive relationship with the magnetic core member and interconnected with the semiconductive device for maintaining the semiconductive device conductive during that portion of the operation when the current flow through the control winding is driving the magnetic core member to saturation in said other direction, and means for connecting said load so as to be energized in accordance with the change in flux in the magnetic core member as produced by the current flow through the control winding.

References Cited in the file of this patent

UNITED STATES PATENTS

| | | |
|---|---|---|
| 2,430,457 | Dimond | Nov. 11, 1947 |
| 2,478,911 | Francis | Aug. 16, 1949 |
| 2,708,722 | Wang | May 17, 1955 |